US010888970B2

(12) United States Patent
McVeigh et al.

(10) Patent No.: US 10,888,970 B2
(45) Date of Patent: Jan. 12, 2021

(54) SHARPENING DEVICE (71) Applicant: Sky Tooling Limited, Poole (GB)

(72) Inventors: Thomas James McVeigh, Montaigut sur Save (FR); Oliver Price, London (GB); Peter Cauwood, Cambridge (GB)

(73) Assignee: Sky Tooling Limited, Poole (GB)

( * ) Notice: Subject to any disclaimer, the term of this patent is extended or adjusted under 35 U.S.C. 154(b) by 322 days.

(21) Appl. No.: 15/519,940

(22) PCT Filed: Oct. 20, 2015

(86) PCT No.: PCT/GB2015/053105
§ 371 (c)(1),
(2) Date: Apr. 18, 2017

(87) PCT Pub. No.: WO2016/063021
PCT Pub. Date: Apr. 28, 2016

(65) Prior Publication Data
US 2017/0326703 A1    Nov. 16, 2017

(30) Foreign Application Priority Data

Oct. 20, 2014    (GB) .................................. 1418598.7

(51) Int. Cl.
*B24B 3/36* (2006.01)
*B24D 15/06* (2006.01)
(Continued)

(52) U.S. Cl.
CPC ................ *B24B 3/36* (2013.01); *B23D 67/00* (2013.01); *B23D 73/02* (2013.01); *B23D 73/10* (2013.01);
(Continued)

(58) Field of Classification Search
CPC ........ B24D 15/00; B24D 15/06; B24D 15/08; B24D 15/082; B24B 3/607; B24B 3/00;
(Continued)

(56) References Cited

U.S. PATENT DOCUMENTS 1,420,072 A * 6/1922 Aronson ................ A63H 33/36
446/22
1,727,292 A    4/1928 Kieffer
(Continued)

FOREIGN PATENT DOCUMENTS

GB        749688      5/1956
GB    2134823 A      8/1984
(Continued)

OTHER PUBLICATIONS

International Preliminary Report on Patentability from counterpart International Application No. PCT/GB2015/053105, dated May 4, 2017, 7 pp.
(Continued)

*Primary Examiner* — Eileen P Morgan
(74) *Attorney, Agent, or Firm* — Shumaker & Sieffert, P.A.

(57) ABSTRACT

According to this application there is provided a portable sharpening device. More specifically, a portable sharpening device comprising a body portion comprising a surfacing member, a mouth in communication with the surfacing member, arranged to guide an object to be sharpened towards the surfacing member; wherein the device is arranged to sharpen a face of said object by relative movement between the surfacing member and the object to be sharpened and wherein said relative movement is created manually by a user.

28 Claims, 7 Drawing Sheets

(51) Int. Cl.
 *B23D 73/02* (2006.01)
 *B23D 73/10* (2006.01)
 *B23D 67/00* (2006.01)
 *B24B 3/00* (2006.01)
 *B24D 15/00* (2006.01)

(52) U.S. Cl.
 CPC ................ *B24D 15/06* (2013.01); *B24B 3/00* (2013.01); *B24D 15/00* (2013.01)

(58) Field of Classification Search
 CPC .. B24B 3/36; B24B 3/60; B23D 67/06; B23D 67/12; B23D 73/02; B23D 73/10
 USPC .................................................. 451/549, 555
 See application file for complete search history.

(56) References Cited

U.S. PATENT DOCUMENTS

| | | | | |
|---|---|---|---|---|
| 2,324,025 | A * | 7/1943 | Revell | B24B 3/605 |
| | | | | 451/164 |
| 5,426,999 | A * | 6/1995 | Seiler | B24B 41/066 |
| | | | | 451/369 |
| 5,499,943 | A * | 3/1996 | Terris | B24B 3/46 |
| | | | | 451/349 |
| 5,618,028 | A * | 4/1997 | Hepworth | B24B 27/027 |
| | | | | 451/375 |
| 6,852,014 | B1 * | 2/2005 | Gleason | B24B 3/605 |
| | | | | 451/45 |
| 7,186,169 | B2 * | 3/2007 | Kawata | B24D 15/06 |
| | | | | 451/164 |
| 2005/0142992 | A1 * | 6/2005 | Kawata | B24D 15/06 |
| | | | | 451/164 |
| 2006/0128285 | A1 * | 6/2006 | Eklund | B24B 3/54 |
| | | | | 451/261 |
| 2007/0054604 | A1 * | 3/2007 | Scott | B24D 15/06 |
| | | | | 451/45 |
| 2008/0214095 | A1 * | 9/2008 | Dovel | B24B 9/04 |
| | | | | 451/65 |
| 2008/0242204 | A1 * | 10/2008 | Grace | A61B 17/54 |
| | | | | 451/553 |
| 2016/0144486 | A1 * | 5/2016 | Bloch | B24D 15/081 |
| | | | | 451/555 |
| 2017/0066109 | A1 * | 3/2017 | Bleier | B24D 15/02 |

FOREIGN PATENT DOCUMENTS

GB 2482332 * 1/2012
WO 0245922 A2 6/2002

OTHER PUBLICATIONS

Written Opinion and International Search Report dated Feb. 9, 2016 in counterpart PCT Application No. PCT/GB2015/053105, 8 pgs.

* cited by examiner

SHARPENING DEVICE

This application is a U.S. national phase application under 37 U.S.C. § 371 of international application number PCT/GB2015/053105 filed on Oct. 20, 2015, which claims the benefit of priority to GB application number 1418598.7 filed Oct. 20, 2014. The entire contents of each of international application number PCT/GB2015/053105 and GB application number 1418598.7 are incorporated herein by reference.

The present invention relates to a sharpening device. Embodiments of the invention relate to a portable sharpening device for sharpening and re-sharpening tools such as scrapers that may have become blunt through use.

Figure 1:
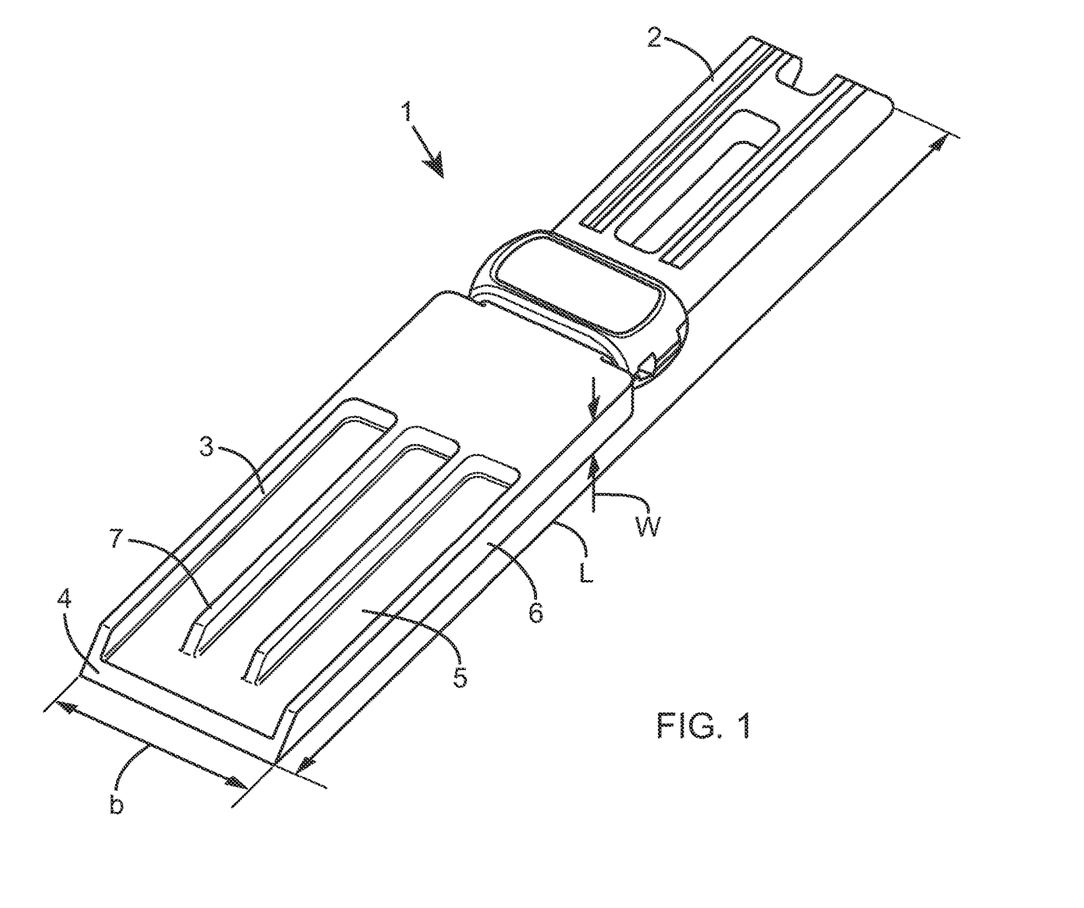
FIG. 1 is a perspective illustration of a tool to be sharpened.

A tool such as a scraper or a chisel is known and comprises a blunt end suitable for holding or gripping by a user and a sharp end for scraping or other abrasive use. The sharp end is located remote from the user end. The sharp end is known to comprise a profiled or bevelled end face or include another type of surface finish to form a suitably sharp cutting and/or scraping surface for use by the user. An example of such a tool is an "Elixair™ SkyScraper". The Elixair™ SkyScraper is illustrated in FIG. 1, showing scraper 1 comprising a user end 2, suitable for gripping in order to operate the scraper and a tool end 3. The scraper 1 has a dimension L along a longitudinal axis, a dimension, or breath, b along an axis substantially perpendicular to longitudinal axis L and a dimension w along a further axis substantially perpendicular to longitudinal axis L and longitudinal axis b. The ends 2, 3 and the tool are manufactured together from strong plastic such as polypropylene or the polyether ether ketone material known as PEEK or ULTEM material. The Elixair™ SkyScraper tool illustrated in FIG. 1 is suitable for removing both cured and partially cured polysulphides, including PRC, from surfaces during manufacturing and servicing functions executed within the aviation industry. In particular, the scraper 1 can be used for removing and scraping back dried adhesive during aircraft wing manufacture. Other coatings or surface finishes can also be removed with the Elixair™ SkyScraper tool.

The tool end 3 becomes blunt through use. The tool 1 becomes less useful with blunting and must either be discarded and recycled or re-sharpened, as appropriate, in order to prolong the useful life of the tool.

Existing sharpening systems are known. Current systems however are available only for use in a controlled environment, for example mounted to a bench or to a wall. An "in situ" or permanently mounted sharpening apparatus relies on user control during the sharpening step or insertion of the tool into a sharpening section or device of the apparatus in order to control the action of an abrasive grinding drum or diamond dresser on the end of the tool to be sharpened. The user can control the abutment of the end of the tool to be sharpened with the sharpening device. In addition, a guide or support may be present at the sharpening apparatus in order to assist the user to control the sharpening operation.

The known sharpening systems and apparatus rely on a stable usage and sharpening situation and mounting and require that a user is in the vicinity of the sharpening apparatus when a tool requires sharpening. The known sharpening systems also comprise a motor to drive the abrasive wheel which requires a power supply e.g. mains power or a battery. The motor and power supply are bulky and make the sharpening system inconvenient to carry around or use in different countries where power supplies may differ.

It is desirable to provide an improved apparatus and method for sharpening a surface of a tool such as a tool that requires sharpening or has become blunt through use, which provides an alternate to the aforementioned devices.

According to the present invention, as seen from a first aspect, there is provided a portable sharpening device comprising:
  a body portion comprising a surfacing member;
  a mouth in communication with the surfacing member, arranged to guide an object to be sharpened towards the surfacing member;
  wherein the device is arranged to sharpen a face of said object by relative movement between the surfacing member and the object to be sharpened; and
  wherein said relative movement is created manually by a user.

Unlike existing sharpeners, the sharpening device of the present invention does not rely on electricity to sharpen the object. The device is not battery operated and does not have to be attached to mains power. This means that the device is more versatile and its operation is not affected by regional power differences or electrical regulations which may vary country by country. The portable sharpening device of the present invention is compact and lightweight and can be readily carried around e.g. in the user's pocket or attached to an item of clothing.

While various non-guided paths of movement between the surfacing member and the object to be sharpened could be provided, preferably, the relative movement between the surfacing member and the object to be sharpened is a rotational movement about an axis of rotation.

In a first embodiment of the present invention, the relative rotational movement between the surfacing member and the object to be sharpened is achieved in use by rotating the surfacing member and the face of the object to be sharpened relative to each other about the axis of operation.

In this embodiment, the body portion preferably further comprises a base body portion and a top body portion, said top body portion comprising the mouth and said base portion comprising the surfacing member. Preferably the surfacing member is fixed relative to the base body portion such that the relative rotational movement is achieved in use by rotating said base body portion and said top body portion relative to each other about the axis of operation.

In a second embodiment of the present invention, the relative rotational movement between the surfacing member and the face of said object to be sharpened is achieved in use by rotating said surfacing member about the axis of operation whilst the object to be sharpened is substantially static.

In this second embodiment, the body portion preferably further comprises a base body portion and a top body portion, said top body portion comprising the mouth and said base portion comprising the surfacing member. Preferably, the surfacing member is moveable relative to the base body portion such that the relative rotational movement is achieved in use by rotating said surfacing member about the axis of operation while the base body portion and the top body portion remain substantially static.

In the second embodiment, the relative rotational movement of the surfacing member about its axis of operation is preferably facilitated by a pull cord.

In this case, preferably the surfacing member is tiltably mounted with respect to the top body portion such that when the pull cord is pulled part of the surfacing member lifts up to engage with the object to be sharpened.

The following features may relate to both the first and second embodiments of the present invention.

Preferably, the mouth comprises one or more lateral guiding fingers arranged to locate the face of the object to be sharpened in an orientation substantially parallel to the surfacing member.

Preferably, the mouth comprises an upper wall, a lower wall and two side walls, the walls being substantially straight such that, when an object to be sharpened is introduced to the mouth, the distance between the object to be sharpened and the upper and lower edges of the mouth is substantially uniform.

Preferably, the lateral guiding fingers are located on an inner portion of the mouth and more preferably, on the lower wall of an inner portion of the mouth.

Preferably, the walls of the mouth are angled relative to the surfacing member such that the object to be sharpened is guided towards the surfacing member at a predetermined angle.

The mouth guides the object to be sharpened towards the surfacing member at a predetermined angle such that the face of the object to be sharpened is in the optimum orientation to be sharpened, substantially parallel to the surfacing member.

The upper and lower walls prevent the object from twisting or translating relative to the axis of operation The guiding fingers ensure that the object to be sharpened enters the mouth substantially straight i.e. parallel to the mouth side walls and prevent the object from twisting laterally within the mouth. This ensures that the entire face of the object to be sharpened is located at the surfacing member in an angle and orientation substantially parallel in preparation from the sharpening operation.

Preferably, the surfacing member comprises an abrasive plate that is substantially planar. Preferably, the surfacing member is substantially circular with the axis of operation at the centre. Alternatively, the surfacing member may be any other shape such as a square, hexagon, pentagon etc. or may have an indefinite shape. The surfacing member may be comprised of a single abrasive plate or alternatively may be comprised of one or more abrasive segments.

Preferably, the portable sharpening device further comprises a handle attached to the body portion. The handle enables the user to carry the device around or hang the device in storage when not required for use. It is envisaged that the user will attach said handle to a belt strap or other item of clothing such that the sharpening device may be readily accessed if and when required.

According to the present invention, as seen from a second aspect, it is envisaged that the portable sharpening device as hereinbefore described will be used to sharpen an object or tool that has been specifically designed to complement and fit the mouth of the sharpening device. Preferably, said object or tool to be sharpened will comprise one or more lateral guiding depressions that are complementary to the lateral guiding fingers of the mouth. In use, the user will insert the tool end with a face to be sharpened into the mouth of the sharpening device such that the one or more lateral guiding fingers engage with the one or more lateral guiding depressions. The upper and lower walls of the mouth will guide the face of said tool towards the surfacing member that is in communication with the mouth. The lateral guiding fingers that are engaged with the lateral guiding depressions of the tool will ensure that the face of the tool to be sharpened is directed towards the surfacing member with the correct orientation for sharpening. This means that when the sharpening action is initiated i.e. the surfacing member and object to be sharpened are rotated relative to each other about the axis of operation, the face of the tool will be efficiently sharpened and accurately sharpened.

The dimensions of the mouth may be any width to receive tools of varying widths w. The guiding fingers of the mouth will ensure that a tool with complementary guiding precessions will be directed towards the surfacing member with the correct orientation and will prevent the tool twisting when inserted in the mouth, regardless of tool width w. The design of the guiding fingers also means that scrapers which are narrower than the mouth can be guided correctly. Preferably the scraper widths are multiples of the spacing between fingers.

According to the present invention, as seen from a third aspect, there is provided a method of sharpening an object, the method comprising:
  (a) providing a surfacing member;
  (b) providing a mouth arranged to guide an object to be sharpened towards the surfacing member, wherein the mouth and surfacing member are moveable relative to each other;
  (c) introducing the object to be sharpened into the mouth;
  (d) providing relative movement between the surfacing member and said object located in the mouth, wherein said relative movement is created manually by a user.

In a first embodiment of the method, the step of providing relative movement between the surfacing member relative to the object to be sharpened comprises moving said object and the surfacing member relative to each other about an axis of operation in one or more arc shapes.

In a second embodiment of the method, the step of providing relative movement between the surfacing member relative to the object to be sharpened comprises rotating the surfacing member about an axis of operation while said object remains static.

In the second embodiment of the method, the rotation of the surfacing member about its axis of operation is preferably facilitated by a pull cord.

In both embodiments of the method, preferably a mouth comprising one or more lateral guiding fingers is provided and preferably the object to be sharpened that is introduced to the mouth comprises one or more lateral guiding depressions complementary to the lateral guiding fingers of the mouth. Preferably, a face of said object is located in an orientation substantially parallel to the surfacing member prior to the step of providing relative rotational movement.

According to the present invention, as seen from a fourth aspect, there is provided a method of sharpening an object, the method comprising:
  (a) providing a portable sharpening device as hereinbefore described, said sharpening device comprising a surfacing member and a mouth;
  (b) introducing an object to be sharpened into the mouth;
  (c) providing relative movement between the surfacing member and said object located in the mouth, wherein said relative movement is created manually by a user.

In a first embodiment of the method, the step of providing relative movement between the surfacing member relative to the object to be sharpened comprises moving said object and the surfacing member relative to each other about an axis of operation in one or more arc shapes.

In a second embodiment of the method, the step of providing relative movement between the surfacing member relative to the object to be sharpened comprises rotating the surfacing member about an axis of operation while said object remains static.

In the second embodiment of the method, the rotation of the surfacing member about its axis of operation is preferably facilitated by a pull cord.

In both embodiments of the method, preferably a mouth comprising one or more lateral guiding fingers is provided and preferably the object to be sharpened that is introduced to the mouth comprises one or more lateral guiding depressions complementary to the lateral guiding fingers of the mouth. Preferably, a face of said object is located in an orientation substantially parallel to the surfacing member prior to the step of providing relative rotational movement.

Embodiments of the invention will now be described in detail, by way of example only, with reference to the accompanying drawings, in which:

FIG. 2a is a perspective illustration of a sharpening apparatus according to an embodiment of the present invention;

FIG. 2b is a perspective illustration of the tool shown in FIG. 1 inserted into the sharpening apparatus shown in FIG. 2a;

FIG. 3 is a perspective illustration of the base portion and top portion of the sharpening apparatus shown in FIG. 2a;

FIG. 4 is an exploded view of parts of the sharpening apparatus shown in FIG. 2a;

The sharpening apparatus and tool to be sharpened will now be described with reference to FIGS. 1, 2a, 2b, 3 and 4. As shown in FIG. 1, the tool 1 comprises a user end 2 suitable for a user to grip in order to operate the tool and a sharp tool (scraper) end 3 comprising a face to be sharpened 4. The tool end 3 is substantially planar and has a width w and a breadth b. Three guiding depressions 5 are spaced laterally along the breadth b of the tool and extend longitudinally of the tool 1. The guiding depressions 5 are delimited by four guiding walls, two outer guiding walls 6 and two inner guiding walls 7. The outer guiding walls 6 extend to the very end of the tool 1 comprising the face to be sharpened 4.

Figures 2A, 2B:
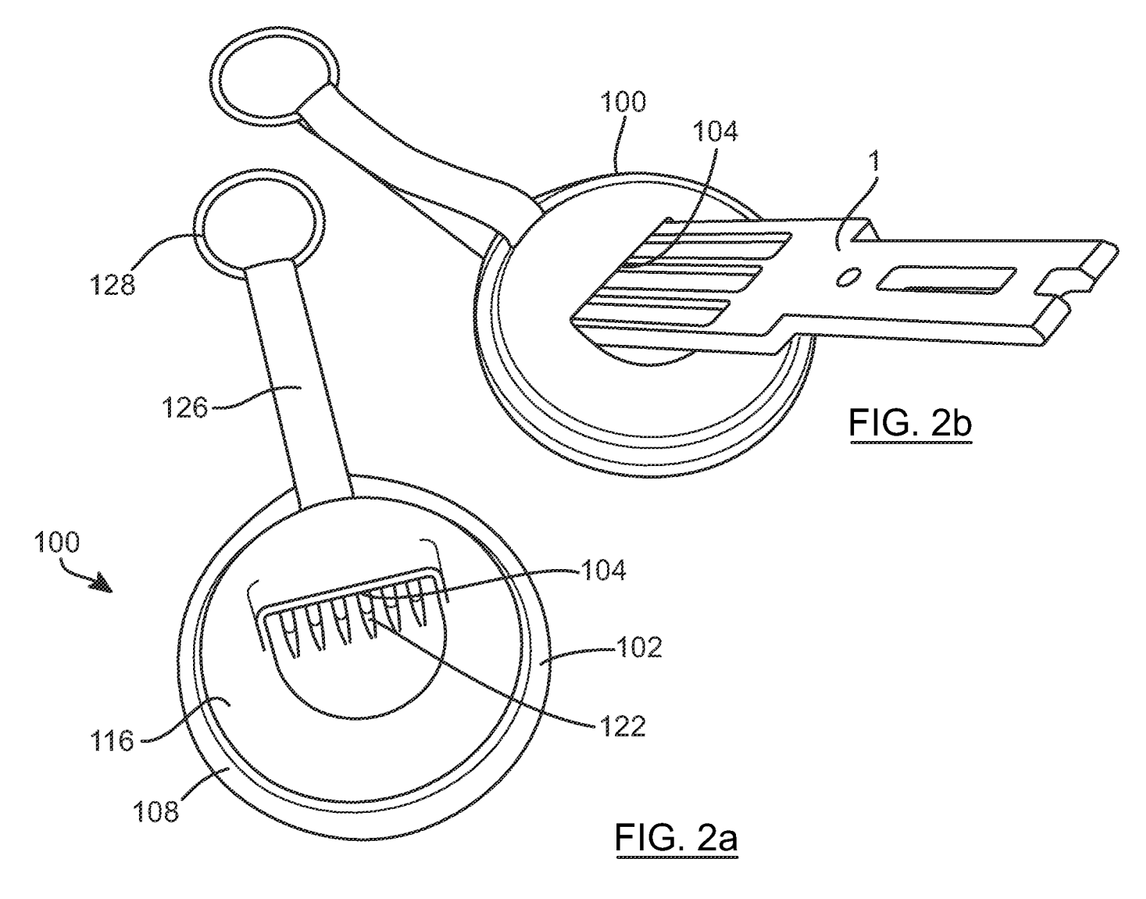
Figure 3:
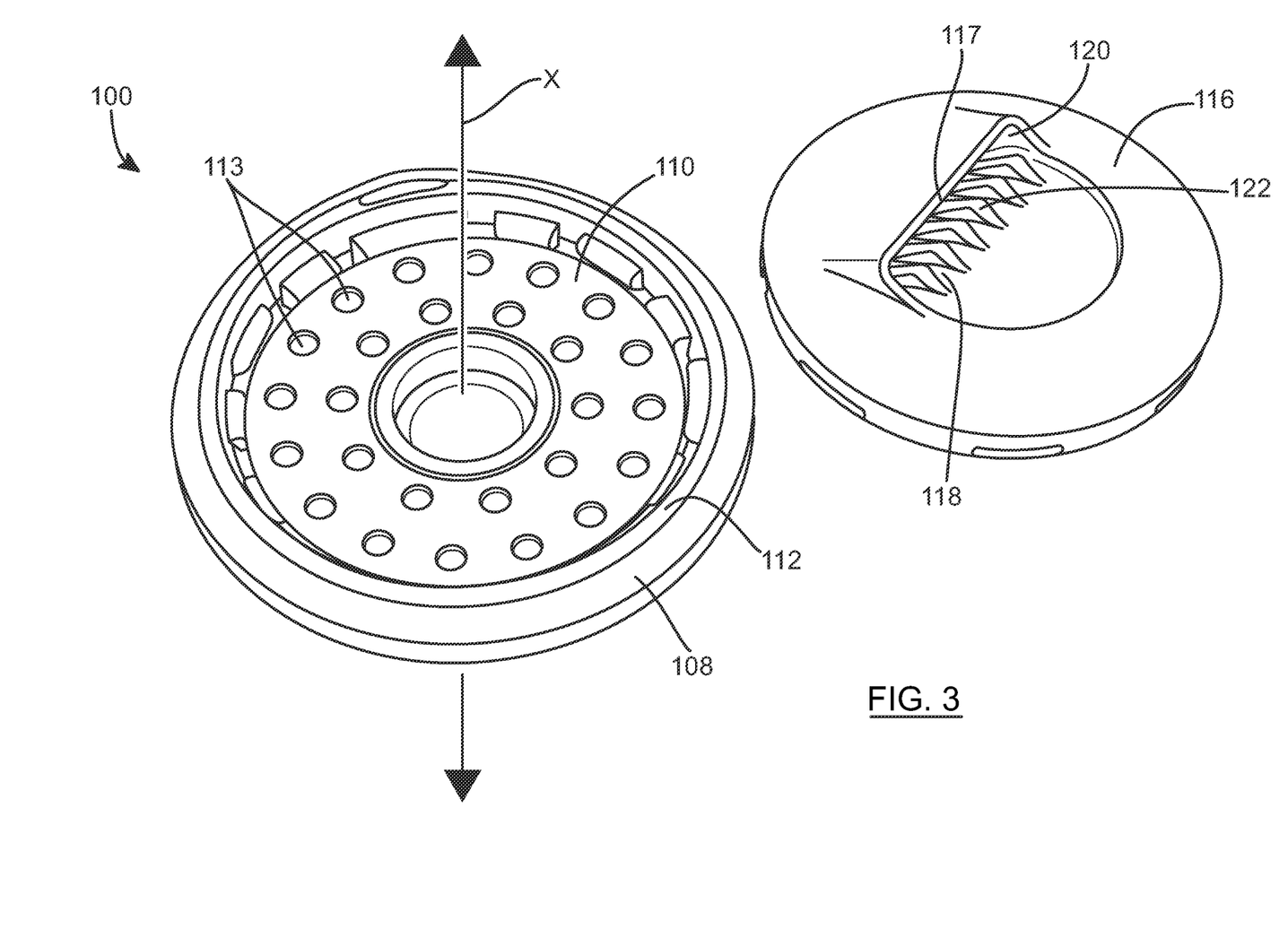
Figure 4:
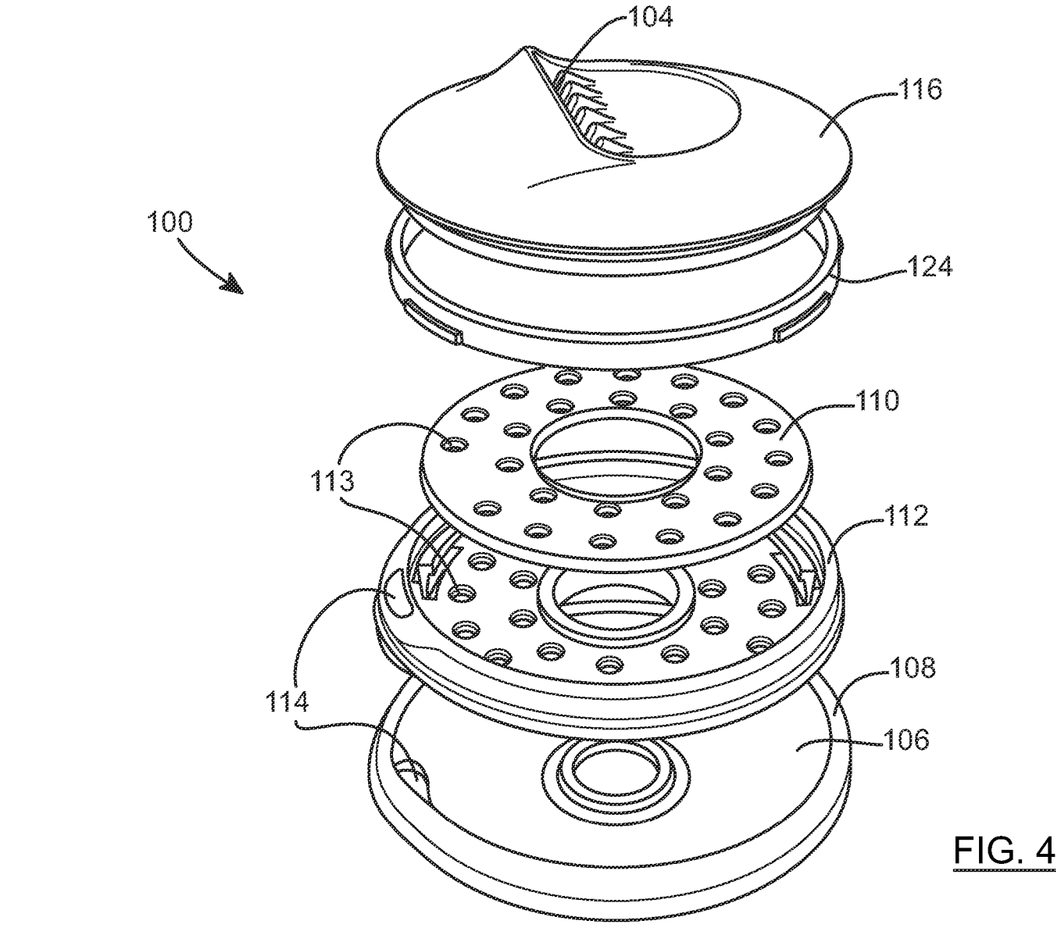
Figure 5:
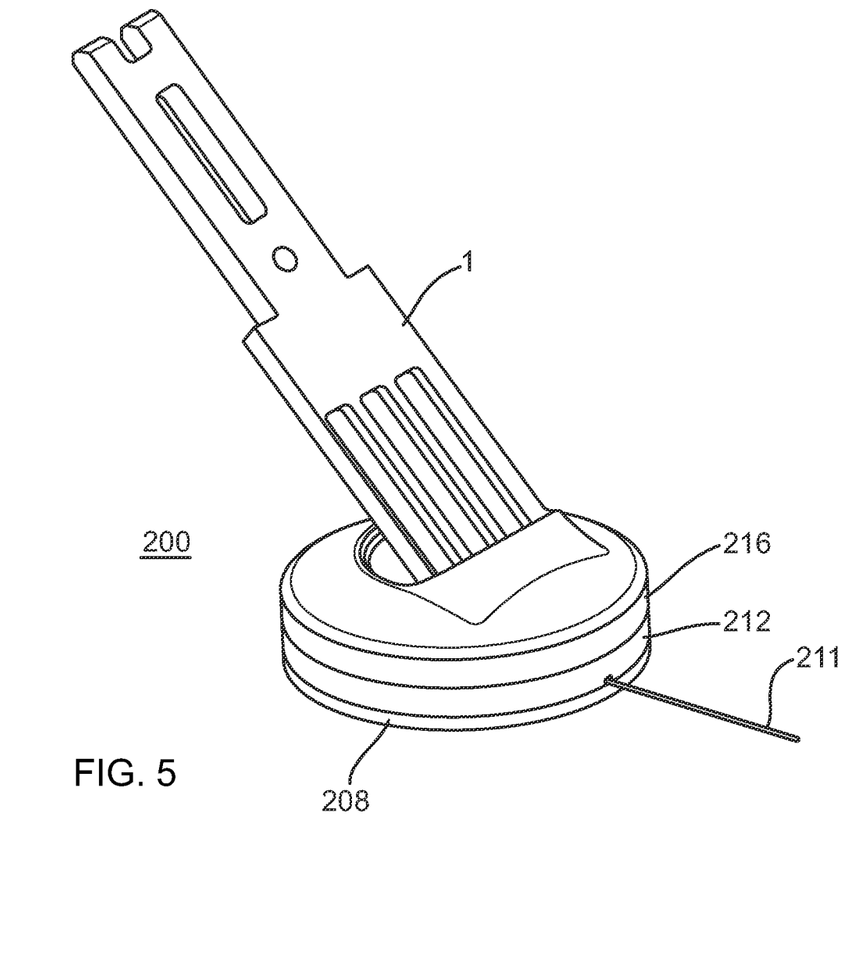
FIG. 5 is a perspective illustration of a sharpening apparatus according to an alternative embodiment of the present invention.

In FIGS. 2a, 3 and 4, there is shown an embodiment of a sharpening device 100 comprising a body portion 102 with a mouth 104. The body portion 102 of the sharpening device 100 comprises a surfacing member support 112 (chassis) which is received within a cavity 106 located in a dust collecting cover 108, which is preferably made of rubber or other flexible material. The device 100 further comprises a substantially circular, planar, O-shaped surfacing member 110 that is received within the surfacing member support 112, and thus within the cavity 106 as seen in FIGS. 3 and 4. The surfacing member 110 is held in place by the surfacing member support 112 such that relative movement between the surfacing member support 112 (and preferably the dust collecting cover 108) and the surfacing member 110 is prevented or at least inhibited. The surfacing member 110 and surfacing member support 112 comprise a number of apertures that are aligned in use such that an effective aperture 113 extends from a top face of the surfacing member 110 to a bottom face of the surfacing member support 112. The dust collecting cover 108 can be peeled off the surfacing member support 112 to permit the dust collected from abrasion to be shaken out or otherwise removed. However, the dust collecting cover 108 cannot be completely removed altogether (and risk being lost) because a strap 126 passes through both the surfacing member support 112 and the dust collecting cover 108.

In use, the effective apertures 113 allow material that is abraded from the face 4 of the tool 1 by the surfacing member 110 to pass through the apertures 113 to the base portion 106, thus keeping the top surface of the surfacing member 110 clear of abraded material. The effective apertures 113 may also prevent the device 100 and/or tool 1 from overheating during the sharpening operation. In the present embodiment the entire assembly is snapped together, and cannot be readily taken apart to facilitate cleaning or to remove and replace the abrasive disc. However, in an alternative embodiment it may be possible for the user to simply lift the top body portion and clear the surfacing member 110 of abraded material by hand.

The mouth 104 which is located on a top body portion 116 is delimited on the inside by an upper wall 117, a lower wall 118 and two side walls 120 that are substantially straight. The mouth 104 also comprises a plurality of lateral guiding fingers 122 arranged on the lower wall 118 of the mouth 104. The guiding fingers 122 are arranged to guide an object or tool to be sharpened 1 towards the surfacing member 110 such that the face to be sharpened 4 of the tool is orientated substantially parallel to a top face of the surfacing member 110 and substantially perpendicular to an axis of operation of the surfacing member 110.

The sharpening device 100 further comprises a rotation washer 124 located between the top body portion 116 and surfacing member support 112. The rotation washer 124 is fixed relative to the surfacing member support 112 and allows the top body portion 116 to rotate relative to the surfacing member support 112 about an axis of operation X (shown in FIG. 3). The rotation washer 124 clips into the surfacing support member 112, and the top body portion 116 clips into the rotation washer 124.

The top body portion 116 further comprises an impression adjacent the mouth 104 and the mouth comprises a raised lip on the outer side of the upper wall 117. The impression and raised lip help to reduce the overall size of the device, soften the outside surface by reducing the height of the opening, and provide a protected flat area to which graphics may be applied.

FIG. 2b shows the tool 1 in use with the sharpening device 100. The tool 1 is inserted through the mouth 104 on the top body portion 116 such that the face to be sharpened 4 is located at the surfacing member 114. The walls of the mouth 104 are angled relative to the surfacing member 114 such that the tool 1 enters the mouth 104 at a predetermined angle. The predetermined angle is arranged such that the face to be sharpened 4 of the tool 1 is located at the correct orientation in relation to the surfacing member so that the sharpening operation can be performed. More particularly, the predetermined angle is such that the face to be sharpened 4 is substantially parallel to the upper surface of the surfacing member 114 as the tool 1 is brought into contact with the surfacing member 114.

The guiding depressions 5 of the tool 1 are substantially complementary to the guiding fingers 122. The tool 1 will thus only be able to be inserted into the mouth 104 if the guiding depressions 5 of the tool 1 are correctly aligned with the guiding fingers 122. In the embodiment shown in FIG. 2b, the tool 1 is substantially the same width w and breadth b as the mouth 104 such that the outer guiding walls 6 of the tool 1 also align with the side walls of the mouth 104 and the distance between the tool 1 and the upper and lower walls of the mouth 104 is substantially uniform.

In alternative embodiments (not shown) the width w of the tool may be narrower than the width of the mouth 104. The lateral guiding fingers 122 ensure that a tool with any width w (less than or equal to the width of the mouth) may be directed such that the face to be sharpened 4 abuts the surfacing member 110 with the correct orientation with the face parallel to the surfacing member 110 and perpendicular to its axis of operation. The guiding fingers 122 prevent a tool with a lesser width w than the mouth 104 from twisting within the mouth 104 which could result in an ineffective sharpening operation or damage to the tool and/or sharpening device 100.

In use, the user will insert the sharp tool end 3 of the tool 1 into the mouth 104. The angle at which the tool 1 may be inserted relative to the surfacing member 110 is predetermined by the angle of the upper and lower walls of the mouth 104. The angle at which the tool 1 may be inserted relative to the mouth is predetermined by the guiding fingers 122 which guide the tool 1 towards the surfacing member such that the face to be sharpened 4 is orientated at the correct orientation on the top face of the surfacing member, in preparation for the sharpening operation.

To sharpen the tool 1, it is envisaged that the user will hold the base body portion 108 firmly in one hand and the user end 2 of the tool 1 firmly in the other hand with the tool end 3 located inside the mouth 104. The user will then turn the tool 1 (which in turn will turn the top body portion 116 comprising the mouth 104) about an axis of operation X in a series of arc-shaped movements.

Alternatively, the user will fix the base body portion (surfacing member support 112 and dust cover 108) to a surface, for example a work bench, and will similarly turn the tool 1 in a series of arc-shaped movements.

It will be appreciated that the length of travel of the tool face 4 across the surfacing member 110 (the abrading action) when moved about the axis of operation X will be restricted by the wrist mobility of the user and thus will be limited to one or more arc-shaped sharpening movements.

It will also be appreciated that for an efficient sharpening operation, the user should exert a sufficient degree of force to urge the tool 1 towards the surfacing member 110 during the sharpening operation so that the tool face 4 is sufficiently abraded by the surfacing member 110 and sharpened.

The base body portion (surfacing member support 112 and dust cover 108) also comprises an aperture 114 suitable for attaching the device 100 to another object. In FIGS. 2a and 2b, the device 100 is shown comprising a looped strap 126 ending in a circular handle 128 attached to the device via the aperture 114. The looped strap 126 and circular handle 128 enable the sharpening device 100 to be carried around or attached to an object. It is envisaged that the strap 126 and handle 128 will be used to attach the device 100 to the belt of a user or to hang the device 100 in a workshop when the device is not required for use.

Referring to FIGS. 5, 6a, 6b, 7a and 7b, there is shown an alternative embodiment of a sharpening device 200 comprising a top body portion 216 with a mouth, which corresponds to the top body portion 116, and further comprising a surfacing member 210 which corresponds to the surfacing member 110. The device 200 is similar to the device 100 and comprises a dust collecting cover 208 which corresponds to the dust collecting cover 108 and a surfacing member support 212 which corresponds to the surfacing member support 112. The mouth and related parts operate in the same way as for the first embodiment. In this embodiment however, the surfacing member 210 is able to rotate within the surfacing member support 212. The surfacing member 210 comprises a rotor shaft (spindle) 241 extending perpendicularly through the rotational axis of the surfacing member 210. The upper half of the rotor shaft 241, visible in FIGS. 6a and 6b engages into a spherical bearing (ball part of a ball and socket joint) 243 (visible in FIGS. 7a and 7b) within the underside of the top body portion 216. This enables the rotor shaft 241 (and thus the surfacing member 210) to rotate with respect to the top body portion 216. The bottom half of the spindle 241, visible in FIGS. 7a and 7b, engages in a slot 242 (a slightly elongate hole) in a mounting part within the surfacing member support 212. The slot 242 permits the bottom end of the rotor shaft 241 to move slightly in the elongate direction of the slot. Only a slight elongation to the hole is required. A ratcheted mounting ring 207 is mounted between the surfacing member 210 and the surfacing support member 212. The ratcheted mounting ring 207 is biased in a first rotational direction by a spring element 209.

The device 200 further comprises a pull cord 211 which is wound around the ratcheted mounting ring 207 and which is moveable between a coiled (pull cord 211 housed substantially within the body of the device 200 and wound around the mounting ring 207) and an uncoiled configuration (pull cord 211 outside of the body of the device 200, and not wound around the mounting ring 207). Referring to FIGS. 6a, 6b, 7a and 7b, when the pull cord 211 is pulled out of the body of the device, the ratcheted mounting ring is rotated in a second rotational direction opposite to the first rotational direction (that is, in an opposite direction to the direction of the spring bias provided by the spring element 209). The ratcheted formations around the periphery of the ratcheted mounting ring 207 engage with complementary formations at the underside of the surfacing member 210, causing the surfacing member 210 to rotate with the ratcheted mounting ring 207. It is this action which causes the surfacing member 210 to grind against and sharpen the tool 1. It will be appreciated that the grinding duration of a single action can therefore be much longer than with the first embodiment, limited only by the length of the pull cord 211 and the arm span of the user.

The pull cord 211 exits the surfacing member support 212 via an aperture 244 at a position which is substantially aligned with the direction along which the bottom end of the spindle 241 is permitted to move. As a result, when the pull cord 211 is pulled out of the housing, the force exerted on the mounting ring 207 (which is itself mounted to the surfacing member 210) will pull the bottom end of the spindle 241 towards the aperture 244 from which the pull cord 211 is drawn, which will cause the rotor shaft 241 and thus the surfacing member 210 to tilt about the spherical bearing 243. This will cause part of the upper surface of the surfacing member 211 to lift up, and part to drop down. The mouth in the top body portion 216 is aligned with the part of the surfacing member 210 which lifts up towards the top body portion 216. As a result, the abrasive surface of the surfacing member 210 is pressed against the (clamped—see below) end of the scraper tool 1, with a force proportional to the tension in the pull cord. This provides for contact between the scraper tool 1 and the abrasive surface of the surfacing member 210 in the case where contact between these elements would otherwise be reduced as the abrasive surface removes material from the tip of the scraper tool 1.

When the pull cord 211 is released, the spring element 209 causes the ratcheted mounting spring 209 to rotate back in the first rotational direction, thereby coiling the pull cord 211 back into the body of the device. In this direction the ratcheted formations around the periphery of the ratcheted mounting ring 207 do not engage with the complementary formations at the underside of the surfacing member 210, and the surfacing member 210 does not therefore rotate back in the first rotational direction. This is achieved because the ratchet formations on the mounting ring 207 are resiliently compressible inwards (towards the centre of the mounting ring 207) by the complementary formations when the mounting ring 207 is rotated in the first direction (but not when it is rotated in the second direction). This is important for several reasons. Firstly, the scraper is clamped in place (by a cam element 223—discussed below) and there is likely to be some friction between the scraper and the abrasive disc which would be more than the return spring could overcome. Secondly, even without this friction, the spring element 209 would otherwise need to be much stronger in order to rotate the much heavier surfacing member 210. Thirdly, in some cases the grinding action may work best if it only occurs in a single direction. More generally, the pull cord 211 is in communication with the surfacing member 210 via the mounting ring 207, and a transition between the coiled and uncoiled configurations is arranged to move the surfacing member 210 relative to the body portion about an axis of orientation.

Figures 6A, 6B:
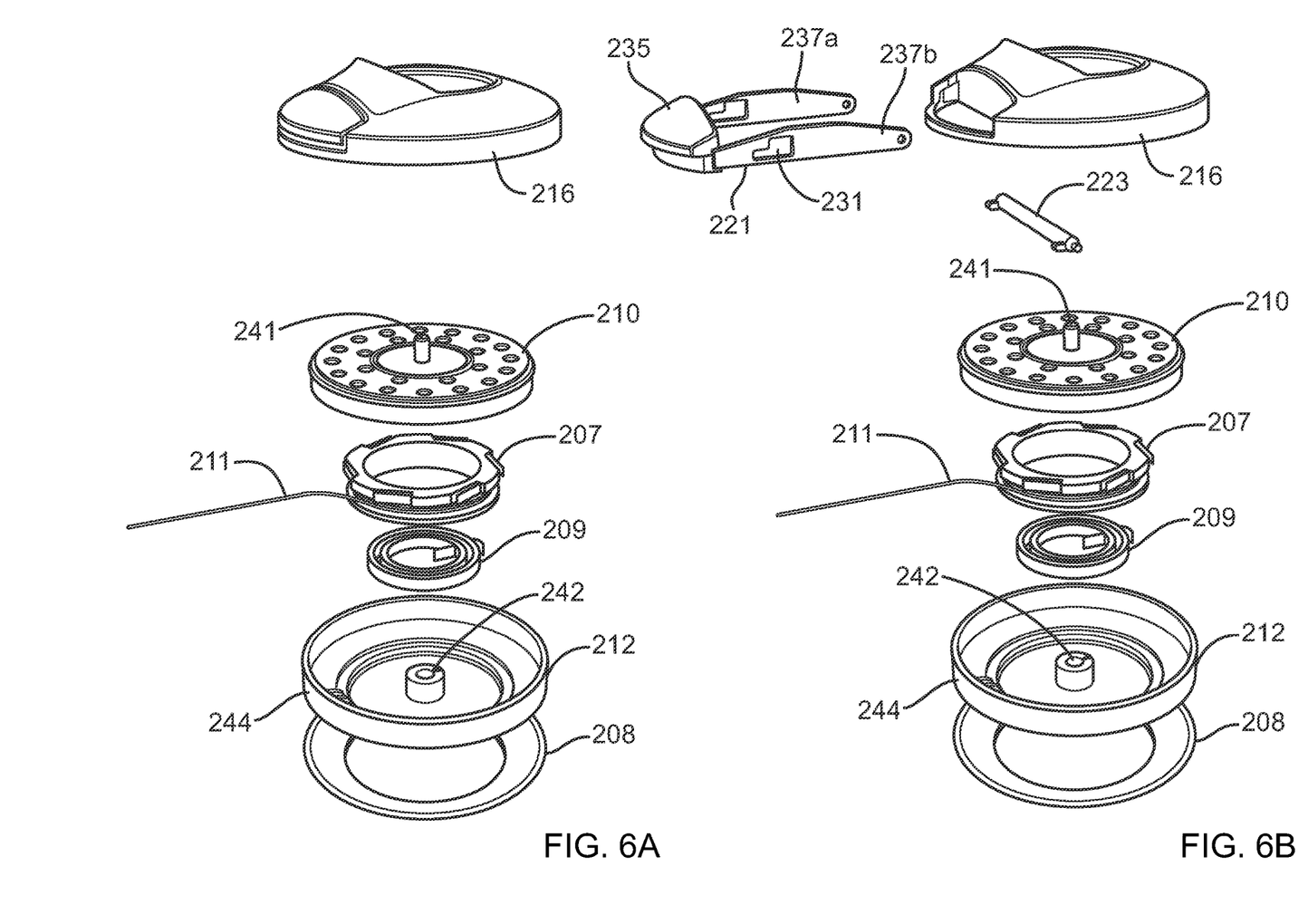
FIGS. 6a and 6b provide exploded views of parts of the sharpening apparatus of FIG. 5, as viewed from above.
Figure 7A:
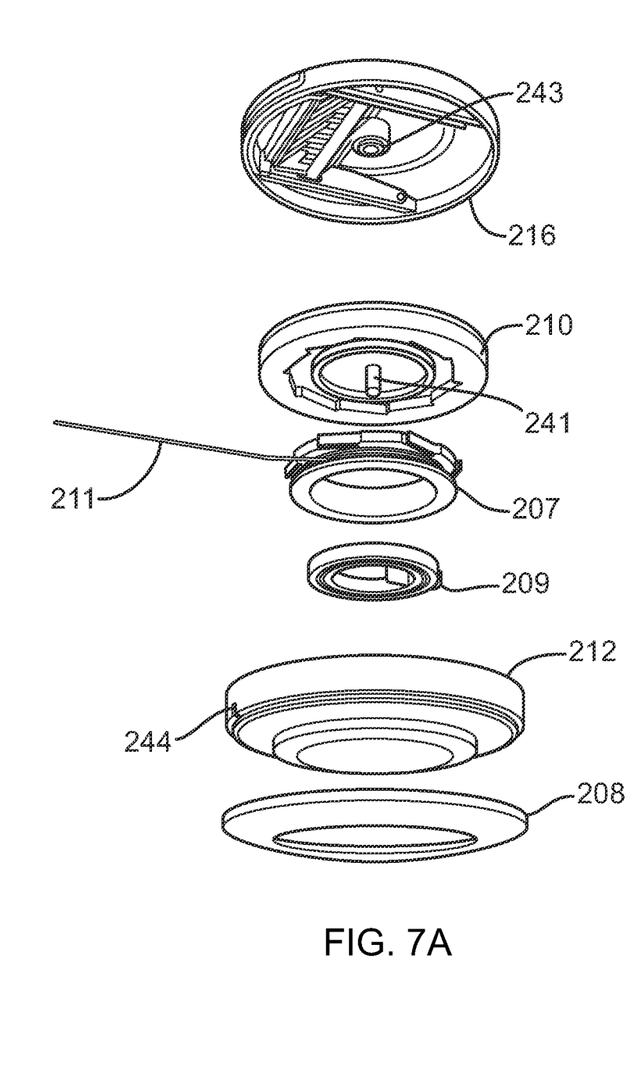
FIGS. 7a and 7b provide exploded views of parts of the sharpening apparatus of FIG. 5, as viewed from below.
Figure 7B:
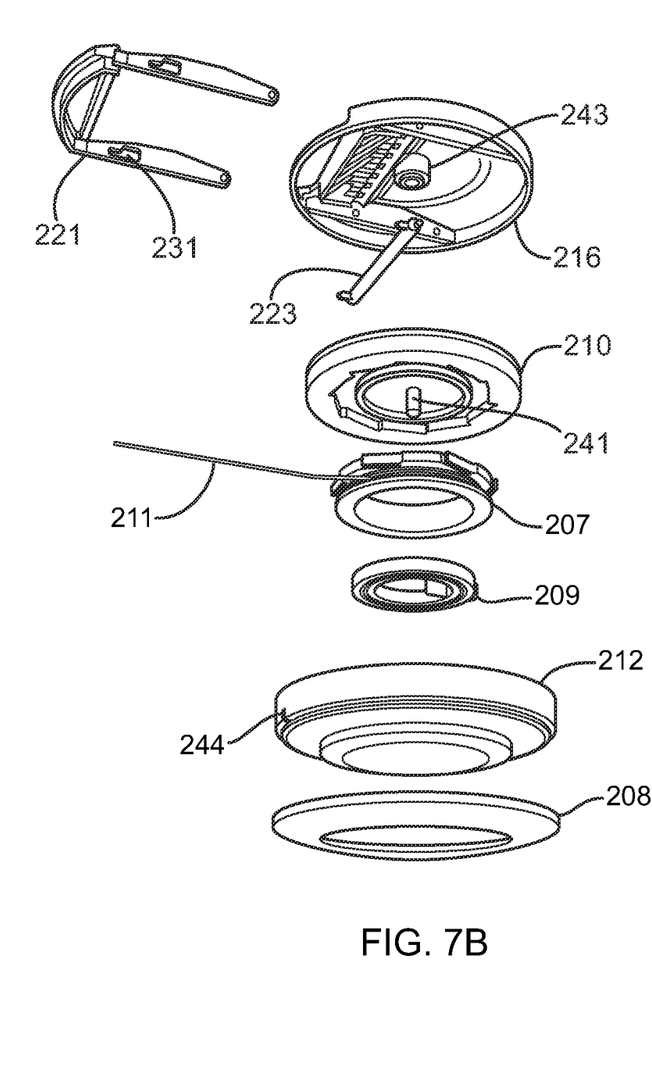

Also notable in FIGS. 6a, 6b, 7a and 7b is a cam element 223 which is hingedly mounted to the underside of the top body portion 216, and which is able to move between a locking position and an unlocked position under the influence of an actuator 221. The cam element 223 has a substantially cylindrical shape, and is coupled to the underside of the top body portion 216 to rotate about an axis of rotation which is offset from the central axis of the cam element 223. The cam element 223 is biased into a raised position (by a spring, or by resilient bias of the actuator 221—described below) in which it engages with the tool to be sharpened. If the user attempts to remove the tool while the cam element 223 is engaged with the tool, then this will cause the cam element 223 to rotate up and against the tool 1, forcing it against the inner wall of the mouth and locking it in place to inhibit removal. This serves to retain the tool in place while sharpening occurs. To release the tool, the user is required to press down on the actuator 221, which is engaged with the cam element 223 via slots 231 in the actuator 221. When the actuator 221 is pressed down, this causes the cam element 223 to move into its lowered position, in which it is not engaged with the tool. The tool can then be removed from the top portion 216 of the device. FIGS. 6b and 7b show the actuator 221 removed from the top body portion 216. The actuator 221 can be seen to comprise a button part 235 from which extends two arms 237a, 237b. The actuator 221 engaged with the top body portion 216, and pivots from the end of the arms 237a, 237b distal from the button part 235. When the button part 235 is depressed, the actuator 221 rotates down with respect to its point of engagement with the top body portion 216, which lowers the slots 231, which in turn causes the cam element 223 to be drawn down away from the tool 1. This permits the tool 1 to be removed from the mouth.

It will be appreciated that the cam element 223 and actuator 221 could be provided on the first embodiment.

To sharpen the tool 1, it is envisaged that the user will hold the base body portion firmly in one hand and the user end 2 of the tool 1 firmly in the other hand with the tool end 3 located inside the mouth 104 and the pull cord in its coiled configuration. The user will then pull the end of the pull cord rapidly such that the pull cord transitions from its coiled configuration to its uncoiled configuration and thus moves the surfacing member relative the body portion and tool 1 about the axis of operation. The relative movement of the surfacing member thus abrades the face 4 of the tool 1.

Unlike the device 100, in the embodiment of the sharpening device 200 the length of travel of the tool face 4 across the surfacing member 114 (the abrading action) when moved about the axis of operation X is not restricted by the mobility of the user's wrist and the tool face 4 can be abraded for a much longer by a single action on the part of the user (i.e. pulling the pull cord).

Similarly to the device 100, the user should exert a sufficient degree of force to urge the tool 1 towards the surfacing member 214 of the device 200 during the sharpening operation so that the tool face 4 is sufficiently abraded by the surfacing member 214 and sharpened. However, the cam part 223 may relieve or avoid the need to do this.

It will be appreciated that the above described embodiments are given by way of example only and that various modifications thereto may be made without departing from the scope of the invention. For example, the surfacing member may separate or may be integral to the base body portion and may be made of a single abrasive material or several pieces of abrasive material. It will be appreciated that it is not essential for the mouth to have side walls since the guiding fingers should sufficiently prevent the object twisting from side to side within the mouth.

The relative rotational movement between the surfacing member and the tool may be initiated in a number of different ways including but not limited to the following examples. The surfacing member (or base portion of the device comprising the surfacing member) may be held by user or fixed in place and a tool located in the mouth of the device may be rotated relative to the surfacing member. Alternatively, both the surfacing member and tool may be held by the user and rotated relative to each other in opposing directions. The surfacing member may be rotated using a pull cord or other means whilst the object to be sharpened is held static in the mouth.

The invention claimed is:

1. A portable sharpening device comprising:
   a body portion comprising a surfacing member, an upper wall, a lower wall, and two side walls, wherein the upper wall, lower wall, and two side walls define a mouth;
   wherein the mouth is in communication with the surfacing member;
   wherein the upper wall, the lower wall, and the two side walls are configured to guide an object to be sharpened towards the surfacing member;
   wherein the device is arranged to sharpen a face of the object to be sharpened by relative movement between the surfacing member and the object to be sharpened;
   wherein the body portion further comprises at least three lateral guiding fingers located on the lower wall of an inner portion of the mouth and spaces exist between adjacent lateral guiding fingers of the at least three lateral guiding fingers, wherein the at least three lateral guiding fingers extend toward but do not contact the upper wall so that the object to be sharpened is received between at least one lateral guiding finger and the upper wall;
   wherein the plurality of lateral guiding fingers are arranged to locate the face of the object to be sharpened in an orientation substantially parallel to the surfacing member; and
   wherein the relative movement is created manually by a user.

2. The portable sharpening device according to claim 1, wherein the relative movement between the surfacing member and the object to be sharpened is a relative rotational movement about an axis of rotation.

3. The portable sharpening device according to claim 2, wherein the relative rotational movement between the surfacing member and the object to be sharpened is achieved in use by rotating the surfacing member and the face of the object relative to each other about the axis of rotation.

4. The portable sharpening device according to claim 3, the body portion further comprising a base body portion and a top body portion, the top body portion comprising the mouth and the base portion comprising the surfacing member,
wherein the surfacing member is fixed relative to the base body portion; and
wherein the relative rotational movement is achieved in use by rotating the base body portion and the top body portion relative to each other about the axis of rotation.

5. The portable sharpening device according to claim 2, wherein the relative rotational movement between the surfacing member and the face of the object to be sharpened is achieved in use by rotating the surfacing member about the axis of rotation while the object to be sharpened is substantially static.

6. The portable sharpening device according to claim 5, the body portion further comprising a base body portion and a top body portion, the top body portion comprising the mouth and the base portion comprising the surfacing member, wherein the surfacing member is moveable relative to the base body portion; wherein the relative rotational movement is achieved in use by rotating the surfacing member about the axis of rotation while the base body portion and the top body portion remain substantially static.

7. The portable sharpening device according to claim 5, wherein the relative rotational movement of the surfacing member about its axis of rotation is facilitated by a pull cord.

8. The portable sharpening device according to claim 7, wherein the pull cord is biased into a retracted position within the device.

9. The portable sharpening device according to claim 7, wherein when the pull cord is retracted from an extended position outside the device to a retracted position within the device, the surfacing member does not rotate.

10. The portable sharpening device according to claim 7, wherein the surfacing member is tiltably mounted with respect to the top body portion such that when the pull cord is pulled part of the surfacing member lifts up to engage with the object to be sharpened.

11. The portable sharpening device according to claim 1, further comprising a locking element for trapping the object to be sharpened within the mouth and against the surfacing member.

12. The portable sharpening device according to claim 1, wherein the upper wall, the lower wall and the two side walls are substantially straight such that, when in use the object to be sharpened is introduced to the mouth, the distance between the object to be sharpened and the upper and lower edges of the mouth is substantially uniform.

13. The portable sharpening device according to claim 1, wherein the walls of the mouth are angled relative to the surfacing member such that the object to be sharpened is guided towards the surfacing member at a predetermined angle.

14. The portable sharpening device according to claim 1, wherein the surfacing member comprises an abrasive plate that is substantially planar.

15. The portable sharpening device according to claim 1, wherein the surfacing member is substantially circular.

16. The portable sharpening device according to claim 1, wherein the surfacing member comprises one or more abrasive segments.

17. The portable sharpening device according to claim 1, further comprising a handle attached to the body portion.

18. A method of sharpening an object, the method comprising:
introducing an object to be sharpened into a mouth of a body portion of a portable sharpening device, wherein the body portion further comprises a surfacing member, wherein the body comprises an upper wall, a lower wall, and two side walls that together define the mouth, wherein the mouth is in communication with the surfacing member, wherein the body further comprises at least three lateral guiding fingers located on the lower wall of an inner portion of the mouth and spaces exist between adjacent guiding fingers of the at least three lateral guiding fingers, wherein the at least three lateral guiding fingers extend toward but do not contact the upper wall so that the object to be sharpened is received between at least one lateral guiding finger and the upper wall, and wherein the at least three lateral guiding fingers are arranged to locate the face of the object to be sharpened in an orientation substantially parallel to the surfacing member;
providing relative movement between the surfacing member and the object to be sharpened located in the mouth, wherein the relative movement is created manually by a user.

19. The method according to claim 18, wherein providing relative movement between the surfacing member and the object to be sharpened comprises moving the object to be sharpened and the surfacing member relative to each other about an axis of rotation in one or more arc shapes.

20. The method according to claim 18, wherein providing relative movement between the surfacing member and the object to be sharpened comprises rotating the surfacing member about an axis of rotation while the object remains static.

21. The method according to claim 20, wherein the rotation of the surfacing member about its axis of operation is facilitated by a pull cord.

22. The method according to claim 18, wherein the object to be sharpened comprises one or more lateral guiding depressions complementary to the plurality of lateral guiding fingers of the mouth.

23. A method of sharpening an object, the method comprising:
providing a portable sharpening device, the portable sharpening device comprising:
a body portion comprising a surfacing member, an upper wall, a lower wall, and two side walls, wherein the upper wall, lower wall, and two side walls define a mouth;
wherein the mouth is in communication with the surfacing member, wherein the body further comprises at least three lateral guiding fingers located on the lower wall of an inner portion of the mouth and spaces exist between adjacent guiding fingers of the at least three lateral guiding fingers,
wherein the is mouth arranged to guide an object to be sharpened towards the surfacing member,
wherein the at least three lateral guiding fingers extend toward but do not contact the upper wall so that the object to be sharpened is received between at least one lateral guiding finger and the upper wall, and wherein the plurality of lateral guiding fingers are arranged to locate the face of the object to be sharpened in an orientation substantially parallel to the surfacing member, introducing the object to be sharpened into the mouth; and providing relative movement between the surfacing member and the object to be sharpened located in the mouth, wherein the relative movement is created manually by a user.

24. The method according to claim 23, wherein providing relative movement between the surfacing member and the object to be sharpened comprises moving the object to be sharpened and the surfacing member relative to each other about an axis of rotation in one or more arc shapes.

25. The method according to claim 23, wherein providing relative movement between the surfacing member and the object to be sharpened comprises rotating the surfacing member about an axis of rotation while the object to be sharpened remains static.

26. The method according to claim 25, wherein the rotation of the surfacing member about its axis of operation is facilitated by a pull cord.

27. The method according to claim 23, wherein the object to be sharpened comprises one or more lateral guiding depressions complementary to the plurality of lateral guiding fingers of the mouth.

28. A portable sharpening device comprising:

a body portion comprising a surfacing member, an upper wall, a lower wall, and two side walls, wherein the upper wall, lower wall, and two side walls define a mouth;

wherein the mouth is in communication with the surfacing member;

wherein the upper wall, the lower wall, and the two side walls are configured to guide an object to be sharpened towards the surfacing member;

wherein the device is arranged to sharpen a face of the object to be sharpened by relative movement between the surfacing member and the object to be sharpened;

wherein the body portion further comprises at least three lateral guiding fingers located on the lower wall of an inner portion of the mouth, wherein the at least three lateral fingers slope toward and away from the upper wall but do not contact the upper wall so that the object to be sharpened is received between at least one lateral guiding finger and the upper wall;

wherein the plurality of lateral guiding fingers are arranged to locate the face of the object to be sharpened in an orientation substantially parallel to the surfacing member; and wherein the relative movement is created manually by a user.

* * * * *